US012778177B2

(12) United States Patent
Jang

(10) Patent No.: US 12,778,177 B2
(45) Date of Patent: Nov. 3, 2026

(54) APPARATUS FOR INJECTING ADDITIVE INTO FOOD AND METHOD FOR INJECTING ADDITIVE INTO FOOD USING THE SAME

(71) Applicant: SNP SYSTEM CO., Ltd., Chungcheongbuk-do (KR)

(72) Inventor: Guen Il Jang, Chungcheongbuk-do (KR)

(73) Assignee: SNP SYSTEM CO., Ltd., Chungcheongbuk-do (KR)

( * ) Notice: Subject to any disclaimer, the term of this patent is extended or adjusted under 35 U.S.C. 154(b) by 893 days.

(21) Appl. No.: 17/863,516

(22) Filed: Jul. 13, 2022

(65) Prior Publication Data

US 2023/0118783 A1 Apr. 20, 2023

(30) Foreign Application Priority Data

Oct. 19, 2021 (KR) ........................ 10-2021-0139146

(51) Int. Cl.
*A23P 20/17* (2016.01)
*A23L 19/00* (2016.01)
(Continued)

(52) U.S. Cl.
CPC ............... *A23P 20/17* (2016.08); *A23L 19/00* (2016.08); *A23L 27/33* (2016.08); *A23L 27/70* (2016.08); *A23L 33/10* (2016.08); *A23V 2002/00* (2013.01)

(58) Field of Classification Search
CPC ................................ A23L 27/33; A23P 20/17
See application file for complete search history.

(56) References Cited

U.S. PATENT DOCUMENTS

2019/0246674 A1* 8/2019 Wang ...................... A23L 27/24

FOREIGN PATENT DOCUMENTS

CN 108112876 A * 6/2018 ............ A23L 33/115
JP 2003339328 A * 12/2003
(Continued)

OTHER PUBLICATIONS

Osha, Drains on Air Receivers; 29 CFR 1910.169(a)(2)(i) and (6)(2), Occupational Safety and Health Administration, 1978 (Year: 1978).*
(Continued)

*Primary Examiner* — Woody A Lee, Jr.
*Assistant Examiner* — Franklin Jefferson Wang
(74) *Attorney, Agent, or Firm* — Harness, Dickey & Pierce, P.L.C.

(57) ABSTRACT

There is provided an apparatus for injecting an additive into a food comprising a storage unit for storing an additive to be injected into a food; an injection unit mounted with a storage container storing the food and injecting the additive into the food; a vacuum suction unit for sucking air in an injection tank to make a vacuum pressure; a compression unit for increasing the pressure by supplying air into the injection tank; a supply unit for supplying the additive in a storage tank to the injection tank; a return unit for returning the additive in the injection tank to the storage tank; a recovery unit for recovering the additive in the storage tank and the injection tank; and a control unit for controlling the storage unit, the injection unit, the vacuum suction unit, the compression unit, the supply unit, the return unit, and the recovery unit.

8 Claims, 13 Drawing Sheets

(51) Int. Cl.

| | |
|---|---|
| ***A23L 27/00*** | (2016.01) |
| ***A23L 27/30*** | (2016.01) |
| ***A23L 33/10*** | (2016.01) |

(56) References Cited

FOREIGN PATENT DOCUMENTS

| | | | | | |
|---|---|---|---|---|---|
| JP | 2007282520 A | * | 11/2007 | | |
| KR | 20170118379 A | * | 10/2017 | ............. | A23L 7/197 |

OTHER PUBLICATIONS

KR-20170118379-A (Park Chan Ung) Oct. 25, 2017 [retrieved on Jun. 4, 2025]. Retrieved from Espacenet Database, translation by EPO and Google. (Year: 2017).*

CN-108112876-A (Jiang Yue-xi) Jun. 5, 2018 [retrieved on Jun. 4, 2025]. Retrieved from Espacenet Database, translation by EPO and Google. (Year: 2018).*

JP-2007282520-A (Wakasa Akira) Nov. 1, 2007 [retrieved on Jun. 4, 2025]. Retrieved from Espacenet Database, translation by EPO and Google. (Year: 2007).*

JP-2003339328-A (Kuwa Munehiko) Dec. 2, 2003 [retrieved on Jun. 4, 2025]. Retrieved from Espacenet Database, translation by EPO and Google. (Year: 2003).*

P. Fellows, Food Processing Technology Principles and Practice, 2000, Woodhead Publishing Limited, Second Edition (Year: 2000).*

* cited by examiner

APPARATUS FOR INJECTING ADDITIVE INTO FOOD AND METHOD FOR INJECTING ADDITIVE INTO FOOD USING THE SAME

CROSS-REFERENCE TO RELATED APPLICATIONS

This application claims the priority of Korean Patent Application No. 10-2021-0139146 filed on Oct. 19, 2021, in the Korean Intellectual Property Office, the disclosure of which is incorporated herein by reference.

FIELD

The present invention relates to an apparatus for injecting an additive into food and a method for injecting an additive into food using the same that may be used to inject an additive such as stevioside for a specific purpose such as improving sugar content in food such as fruits and vegetables.

BACKGROUND

In general, taste is considered as an important item for food intake with nutritional satisfaction, health promotion-related functions, and safety of ingredients. Research has been conducted on a method of making a taste when the nutrition and the like are abundant but the taste is poor, and great efforts are being made to increase the nutrition and the like when the taste is good but the nutrition and the like are insufficient.

For example, tomatoes have many nutritional ingredients, but low sugar content, which may be a representative example of foods that children do not like.

For this reason, in the related art, there have been proposed methods for treating fruits before or after harvesting the fruits by using ingredients such as sugar to increase the sugar content of fruits, but there are various problems such as suppression of fruit production or unsuitable for the human body due to high sugar and calories.

In order to solve this problem, an injection method for increasing the sugar content by injecting a *stevia* ingredient, which is known to be 300 times sweeter than sugar, but to have almost no calories, into the fruits is being used.

However, the injection method according to the related art is constituted by a method of injecting an additive in a vacuum state or injecting an additive in a pressurized state, and also, there is proposed a method for injecting an additive into specific fruits such as tomatoes and apples.

Therefore, the method according to the related art is a method for injecting an additive into a specified fruit or vegetable using a specified method, and there is a limit to the injection of various additives suitable for the characteristics of various fruits and vegetables.

SUMMARY

An aspect of the present invention provides an apparatus for injecting an additive into food and a method for injecting an additive into food using the same capable of injecting various additives such as sugar content enhancing ingredients, nutrition enhancing ingredients, and the like into various foods such as fruits, vegetables, and the like.

According to an aspect of the present invention, there is provided an apparatus for injecting an additive into a food including a storage unit 100 for storing an additive S to be injected into a food F; an injection unit 110 mounted with a storage container 113 storing the food F and injecting the additive S into the food F; a vacuum suction unit 120 for sucking air in an injection tank 111 to make a vacuum pressure; a compression unit 130 for increasing the pressure by supplying air into the injection tank 111; a supply unit 140 for supplying the additive S in a storage tank 101 to the injection tank 111; a return unit 150 for returning the additive S in the injection tank 111 to the storage tank 101; a recovery unit 160 for recovering the additive S in the storage tank 101 and the injection tank 111; and a control unit (not illustrated) for controlling the units.

In the apparatus for injecting an additive into a food of the present invention, the storage unit may provide a means for storing the additive S by including the storage tank 101 which stores the additive S and assists to inject the additive S; a first shut-off valve 102 provided to open or close the storage tank 101; a first level sensor 103 for sensing a maximum storage position when the additive S is filled in the storage tank 101; and a second level sensor 104 for sensing a minimum storage position of the additive S required for the additive S injection operation.

In the apparatus for injecting an additive into a food of the present invention, the injection unit may provide a means for injecting the additive into the food by including the injection tank 111 for providing a space so that the additive S injection operation may be performed; a cover 112 provided to open or close the injection tank 111; the storage container 113 provided to contain the food F to be injected with the additive S; a support 114 provided to mount the storage container 113 containing food F; a third level sensor 115 for sensing a minimum level when the food F is not immersed in the additive S; a fourth level sensor 116 for sensing a maximum level when the food F is not immersed in the additive S; a fifth level sensor 117 for sensing a level when the food F is completely immersed in the additive S; and a second shut-off valve 118 that is selectively opened when the pressure inside the injection tank 111 is made into atmospheric pressure.

In the apparatus for injecting an additive into a food of the present invention, the vacuum suction unit may provide a means for making the pressure in the injection tank 111 into a vacuum pressure by including a vacuum pump 121 for providing power to suck the air inside the injection tank 111; a suction flow path 122 connected between the injection tank 111 and the vacuum pump 121 to guide the air inside the injection tank 111 to be sucked; a first air storage tank 123 for storing the air and reducing the impact generated at the moment when the air suction is started; a first opening/closing valve 124 for selectively opening or closing the suction flow path 122; a vacuum regulator 125 for maintaining the pressure in the injection tank 111 at a set vacuum pressure; a vacuum gauge 126 indicating a pressure state in the injection tank 111; and a drain valve 127 for discharging water filled in the first air storage tank 123.

In the apparatus for injecting an additive into a food of the present invention, the compression unit may provide a means for increasing the pressure in the injection tank 111 by including an air compressor 131 for providing power to supply air into the injection tank 111; a compression flow path 132 connected between the injection tank 111 and the air compressor 131 to guide the air to be supplied into the injection tank 111; a second air storage tank 133 for storing the air and reducing the impact generated at the moment when the air supply is started; a second opening/closing valve 134 for selectively opening or closing the compression flow path 132; a pressure regulator 135 for maintaining the pressure in the injection tank 111 at a set pressure; a pressure gauge 136 indicating a pressure state in the injection tank 111; and a drain valve 137 for discharging water filled in the second air storage tank 133.

In the apparatus for injecting an additive into a food of the present invention, the supply unit may provide a means for supplying the additive S of the storage tank 101 to the injection tank 111 by including a first circulation pump 141 for providing power so that the additive S in the storage tank 101 may be supplied to the injection tank 111; a supply flow path 142 which is connected to the lower portion of the storage tank 101 and the upper portion of the injection tank 111 to guide the additive S in the storage tank 101 to be supplied to the injection tank 111; a third opening/closing valve 143 for selectively opening or closing the supply flow path 142; and a spray nozzle 144 connected to one end of the supply flow path 142 and positioned at an upper portion in the injection tank 111 to supply the additive S to the food F.

In the apparatus for injecting an additive into a food of the present invention, the return unit may provide a means for returning the additive S in the injection tank 111 to the storage tank 101 by including a second circulation pump 151 for providing power so that the additive S in the injection tank 111 may be returned to the storage tank 101; a return flow path 152 connected to the lower portion of the injection tank 111 and the upper portion of the storage tank 101 to guide the additive S of the injection tank 111 to be returned to the storage tank 101; and a fourth opening/closing valve 153 for selectively opening or closing the return flow path 152.

In the apparatus for injecting an additive into a food of the present invention, the recovery unit may provide a means for recovering the additive S in the storage tank 101 and the injection tank 111 after replacing the additive S or terminating the injection operation by including a recovery tank 162 for storing the recovered additive S; a third circulation pump 161 for providing power to recover the additive S in the storage tank 101 and the injection tank 111 to the recovery tank 162; a first recovery flow path 163 connected to the lower portion of the storage tank 101 to guide the additive S to be recovered to the recovery tank 162; a second recovery flow path 164 connected to the lower portion of the injection tank 111 to guide the additive S up to a junction Z of the first recovery flow path 163 so as to be recovered to the recovery tank 162; a fifth opening/closing valve 165 for selectively opening or closing the first recovery flow path 163; a sixth opening/closing valve 166 for selectively opening or closing the second recovery flow path 164; and a third shut-off valve 167 for opening or closing the recovery tank 162.

In the apparatus for injecting an additive into a food of the present invention, the control unit (not illustrated) may provide a control means for controlling the storage unit 100, the injection unit 110, the vacuum suction unit 120, the compression unit 130, the supply unit 140, the return unit 150, and the recovery unit 160.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

Figure 1:
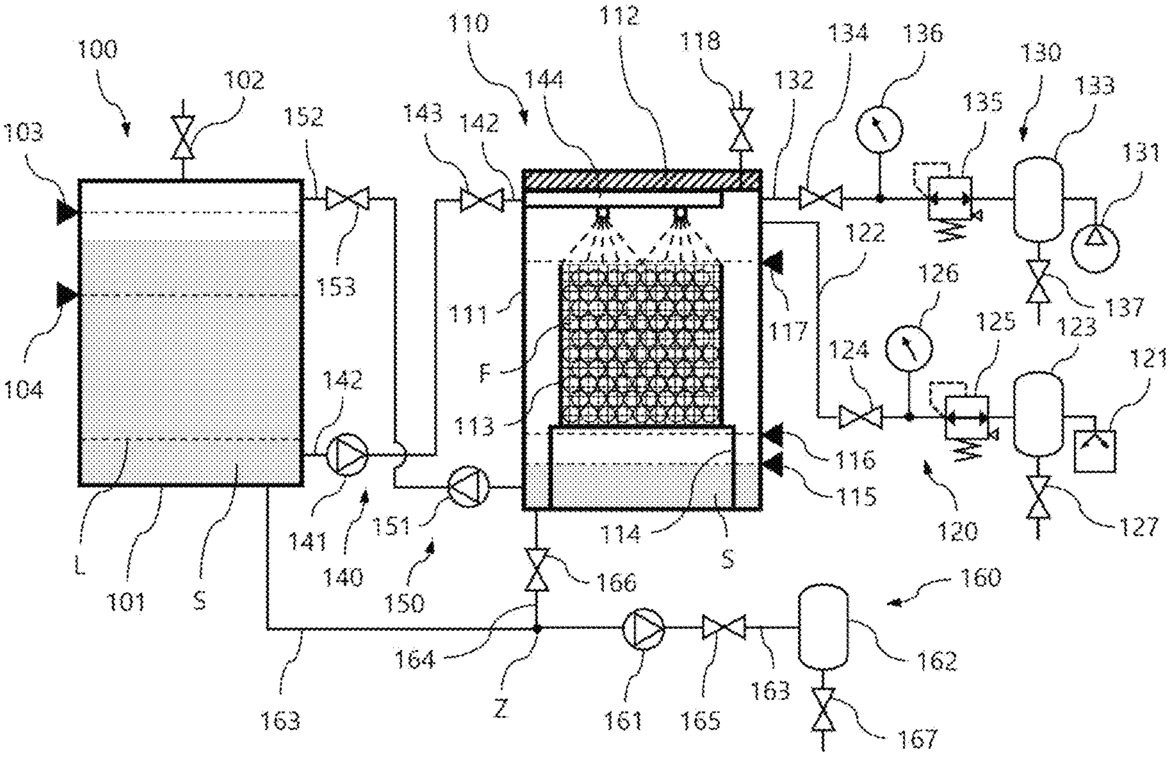
FIG. 1 is a diagram illustrating a configuration of an apparatus for injecting an additive according to the present invention.

Exemplary embodiments of the present invention will now be described in detail with reference to the accompanying drawings.

Exemplary embodiments described in this specification and configurations illustrated in the drawings are only preferred examples of the disclosed invention, and there may be various modifications capable of replacing the exemplary embodiments and drawings of the present specification at the time of filing of the present application. The present invention may be implemented in various different forms and is not limited to exemplary embodiments described herein.

In addition, throughout this specification, when a certain part comprises a certain component, unless explicitly described to the contrary, it will be understood to further comprise other components without excluding other components.

An apparatus for injecting an additive into food according to the present invention is intended to provide an apparatus and a method for injecting additives into foods such as fruits, vegetables, and meat to increase the sugar content or to have functional ingredients. The target food of the present invention may be agricultural products, livestock products, and forest products, and broadly includes everything that can be consumed by humans. In addition, the target additive of the present invention includes all ingredients worthy of being injected into foods, such as health supplement ingredients, fragrance ingredients, and the like as well as a *stevia* ingredient for increasing the sugar content.

Hereinafter, preferred exemplary embodiments of the present invention will be described in detail with reference to the accompanying drawings.

Figure 2:
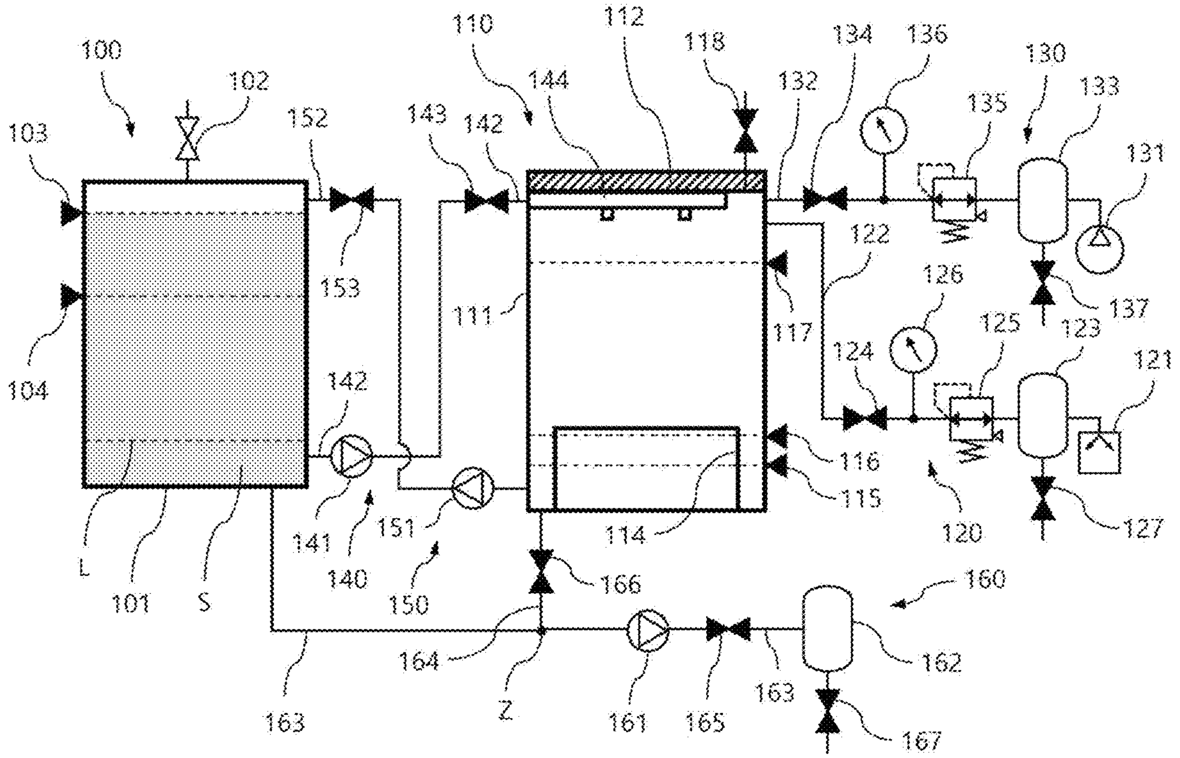
FIG. 2 is a diagram illustrating an additive storage step in the apparatus for injecting the additive according to the present invention.
Figure 3:
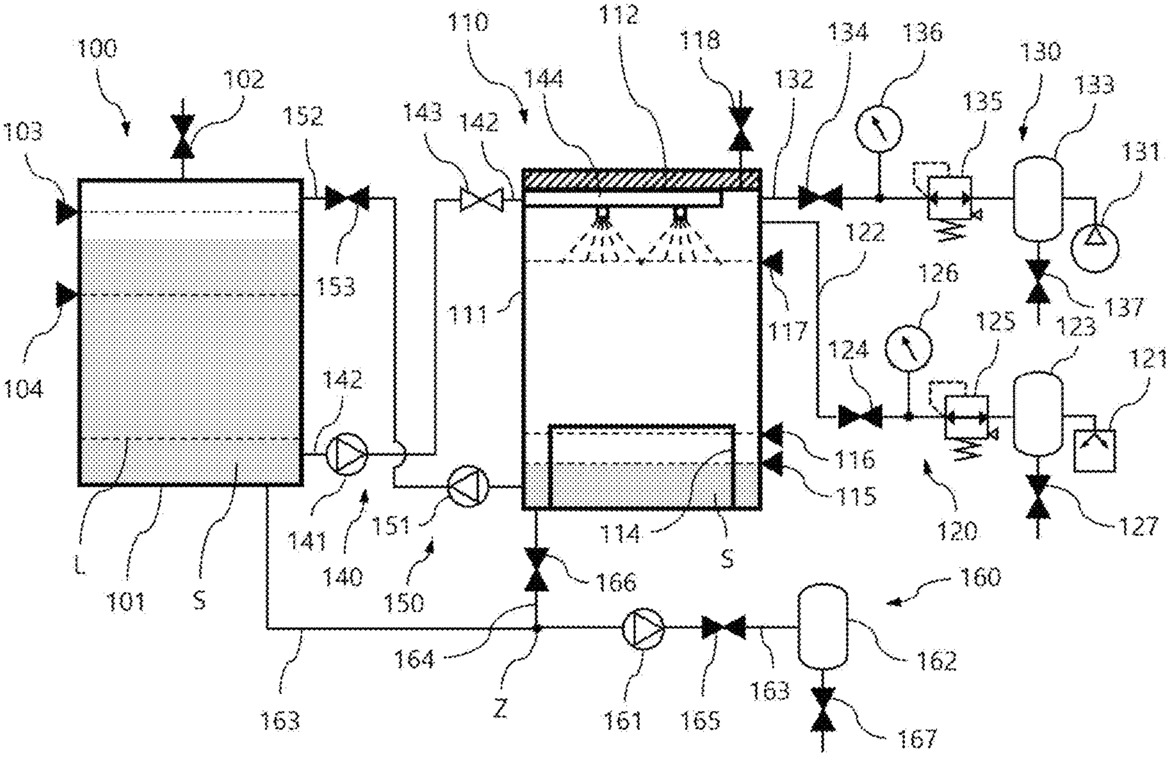
FIG. 3 is a diagram illustrating an injection preparation step in the apparatus for injecting the additive according to the present invention.
Figure 4:
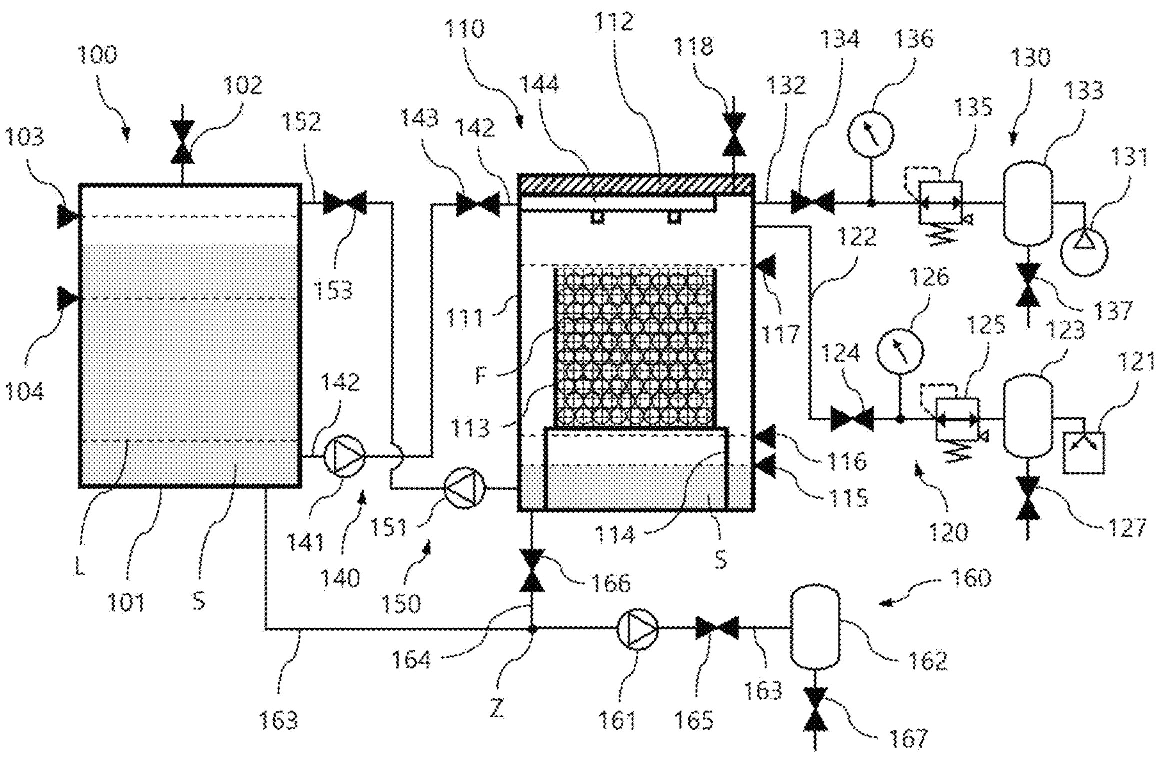
FIG. 4 is a diagram illustrating a food preparation step in the apparatus for injecting the additive according to the present invention.
Figure 5:
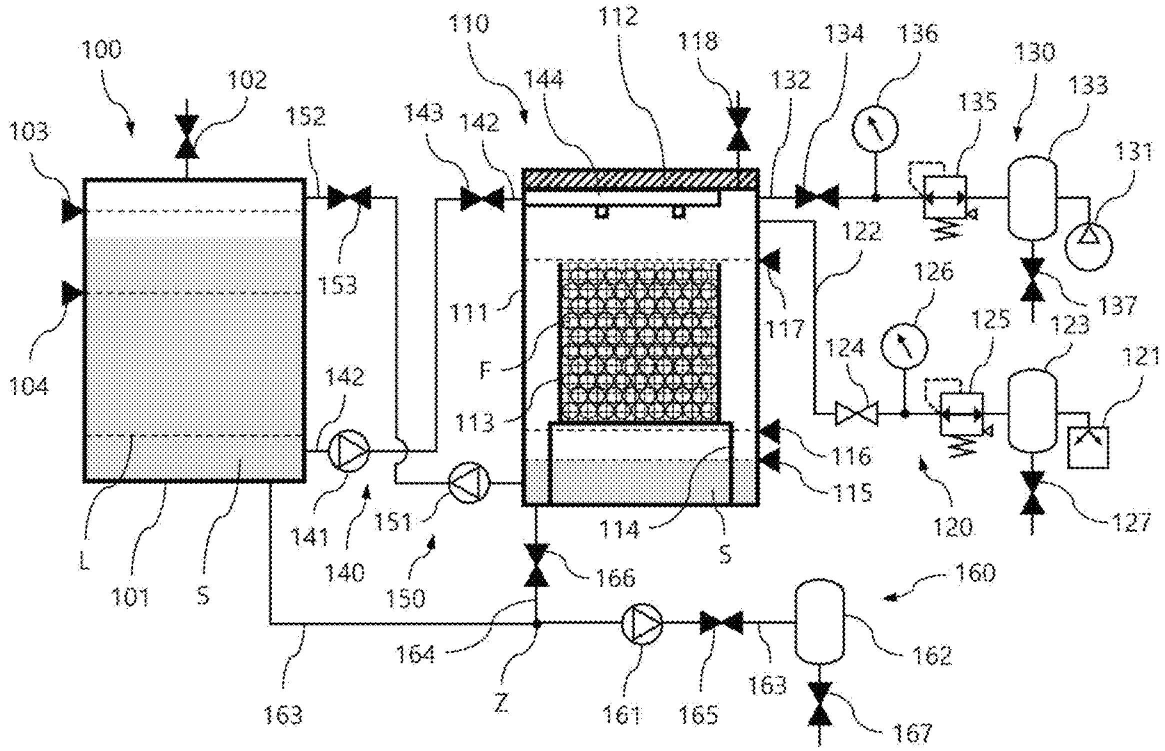
FIG. 5 is a diagram illustrating a vacuum suction step in the apparatus for injecting the additive according to the present invention.
Figure 6:
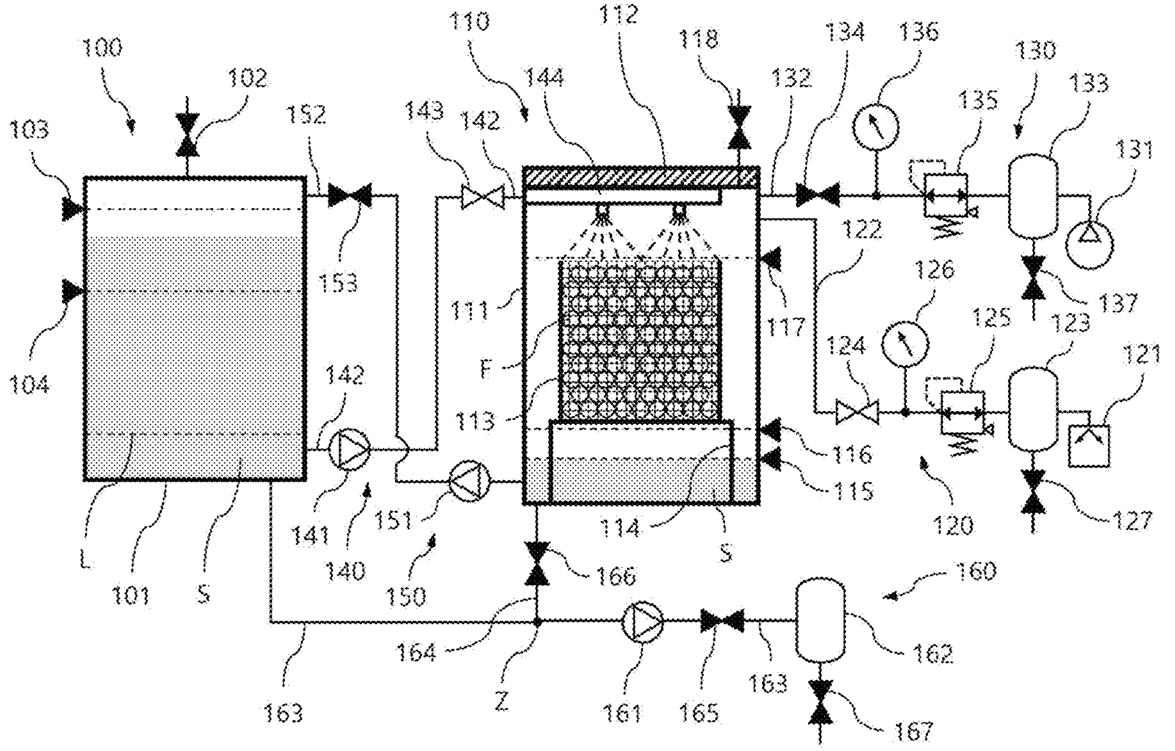
FIG. 6 is a diagram illustrating a spray vacuum injection step in the apparatus for injecting the additive according to the present invention.
Figure 7:
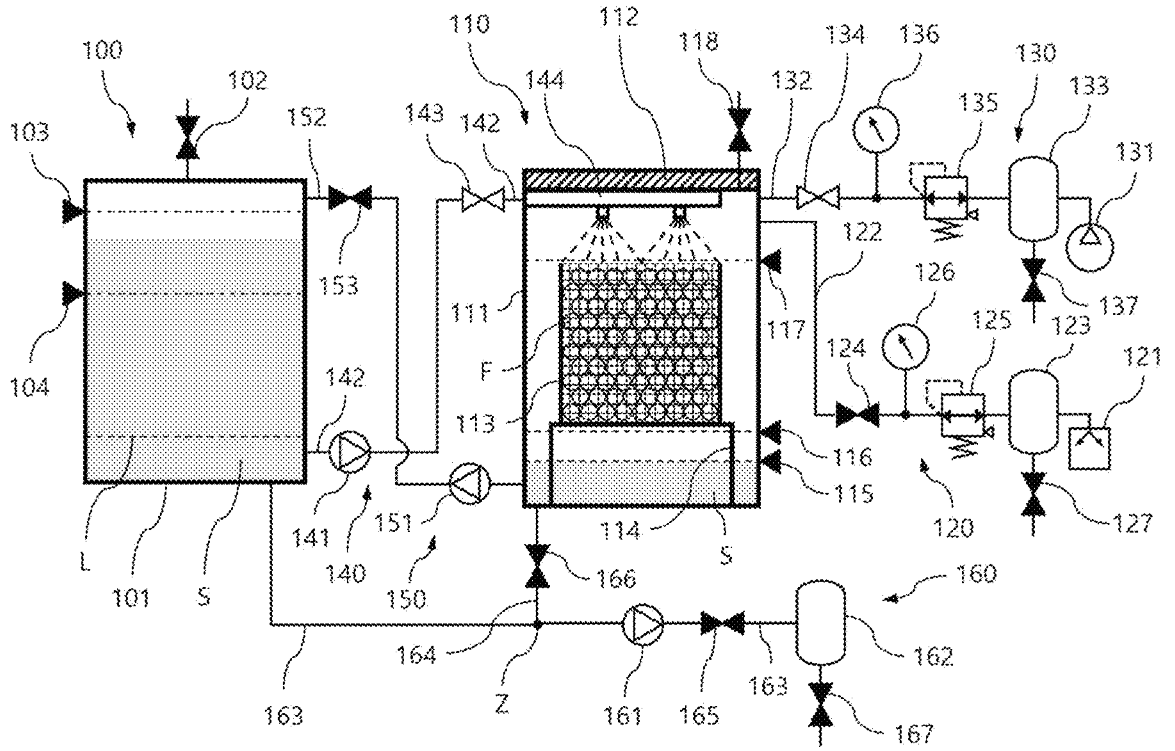
FIG. 7 is a diagram illustrating a spray pressure injection step in the apparatus for injecting the additive according to the present invention.
Figure 8:
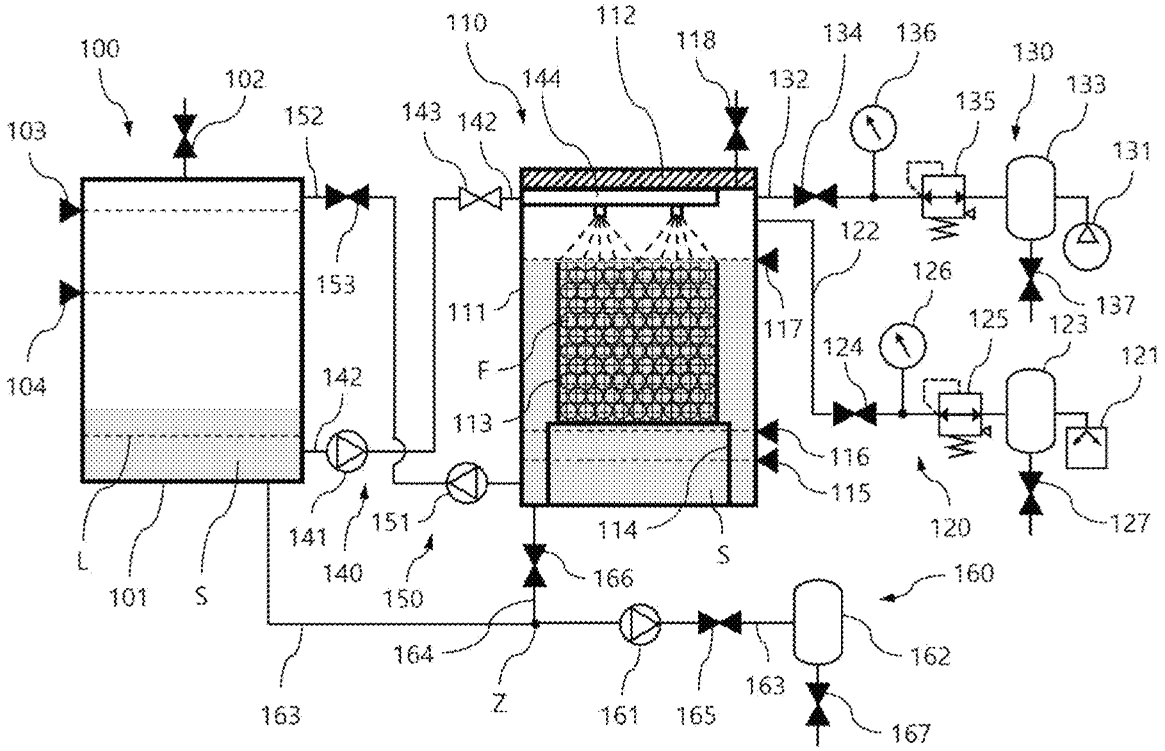
FIG. 8 is a diagram illustrating a food immersion step in the apparatus for injecting the additive according to the present invention.
Figure 9:
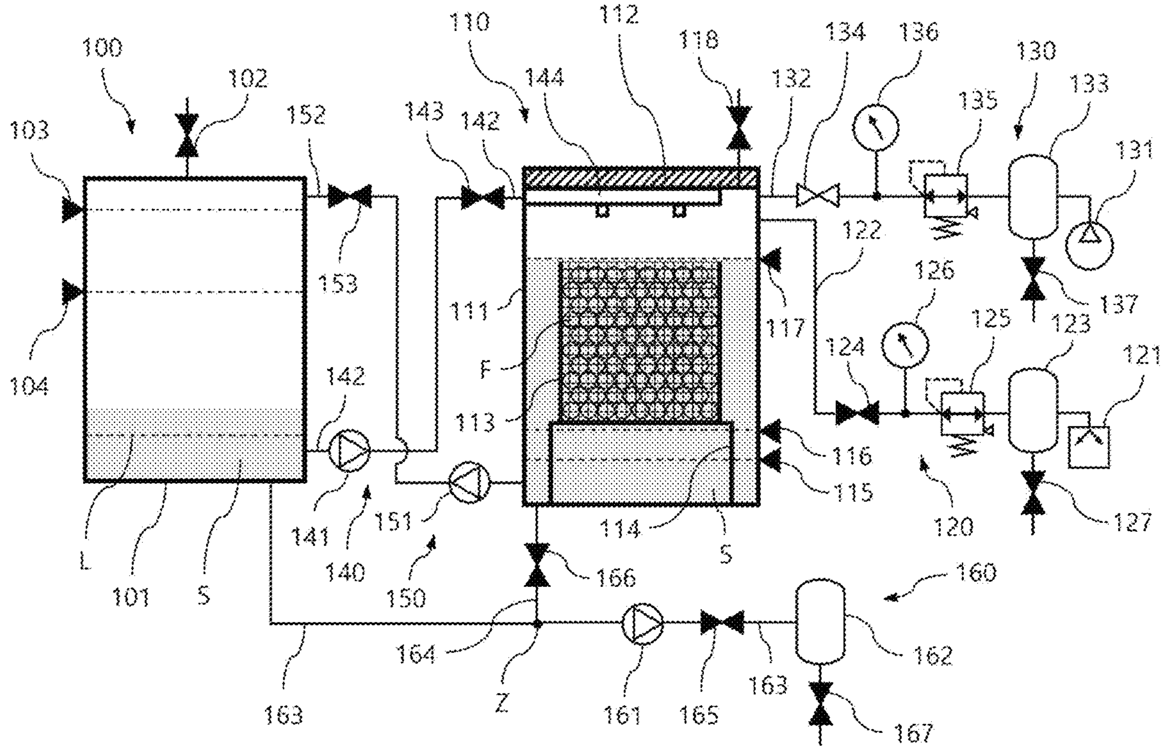
FIG. 9 is a diagram illustrating an immersion pressure injection step in the apparatus for injecting the additive according to the present invention.
Figure 10:
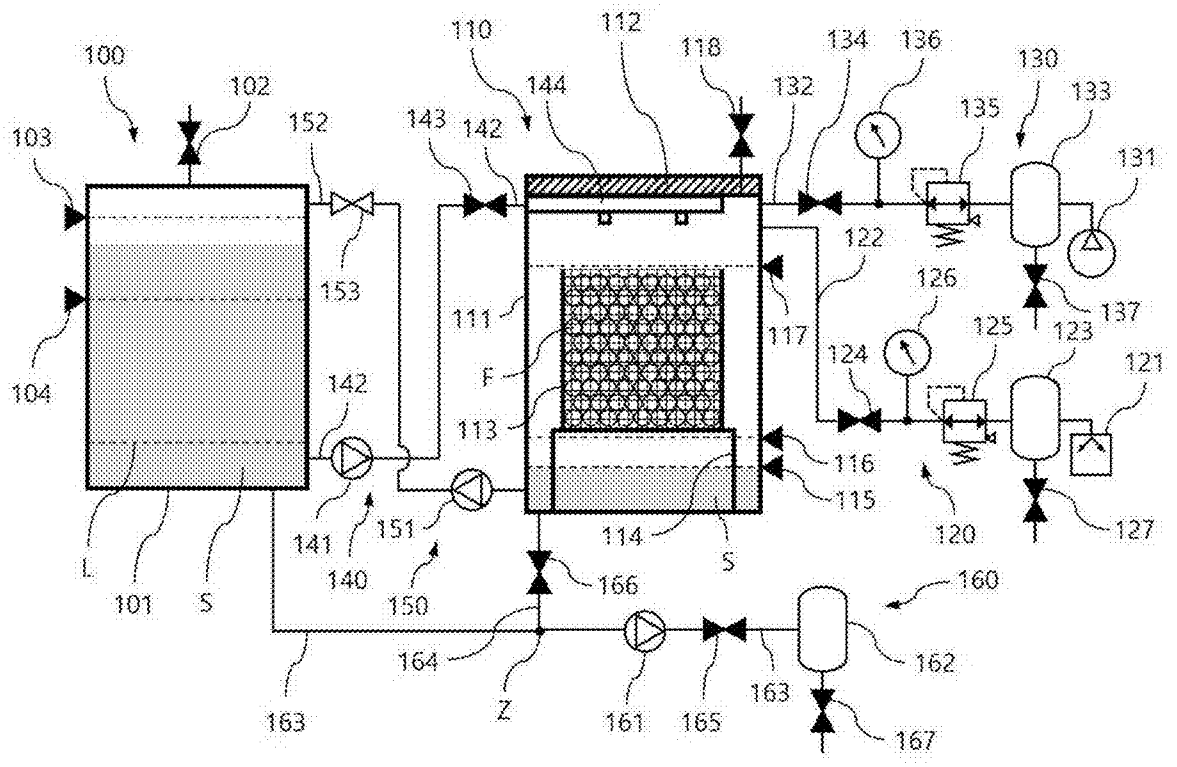
FIG. 10 is a diagram illustrating an additive returning step in the apparatus for injecting the additive according to the present invention.
Figure 11:
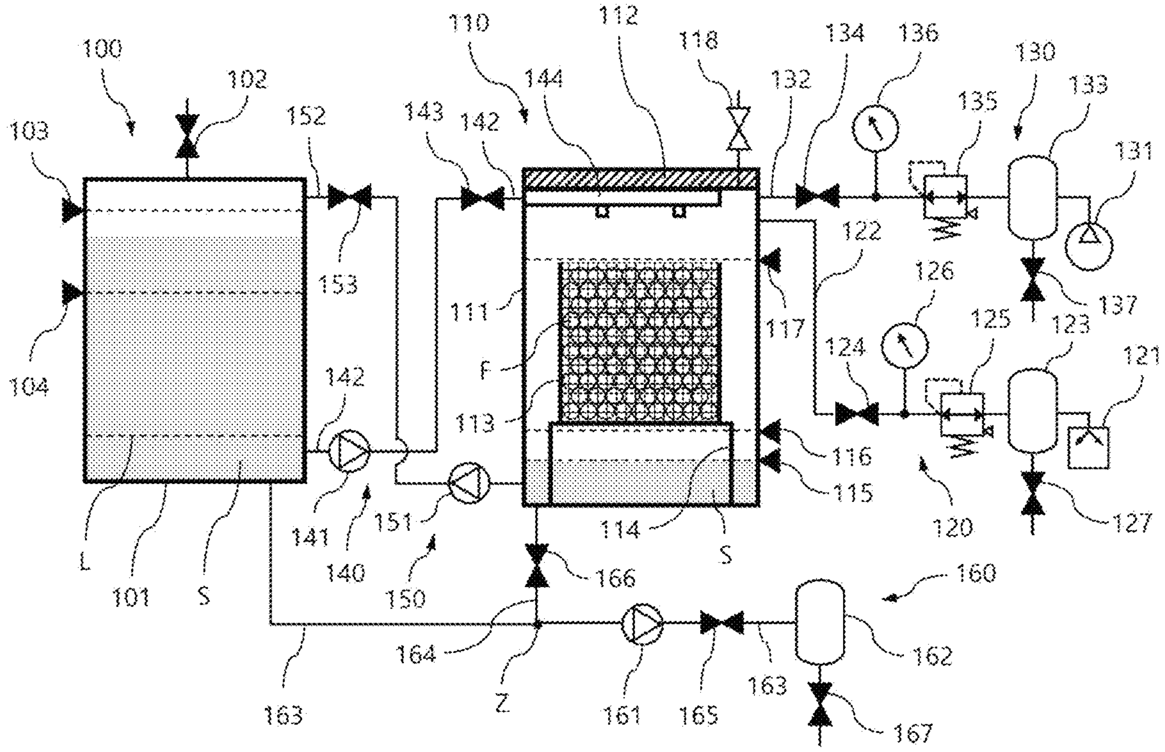
FIG. 11 is a diagram illustrating an injection completion step in the apparatus for injecting the additive according to the present invention.
Figure 12:
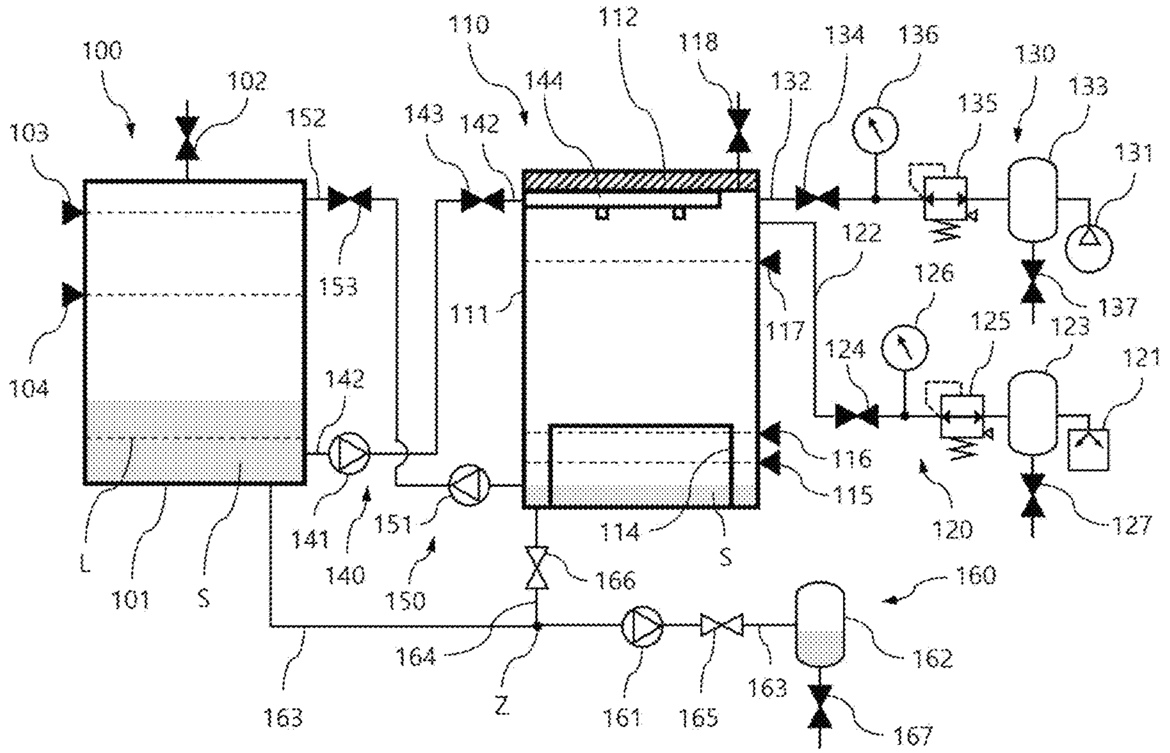
FIG. 12 is a diagram illustrating an additive recovery step in the apparatus for injecting the additive according to the present invention.
Figure 13:
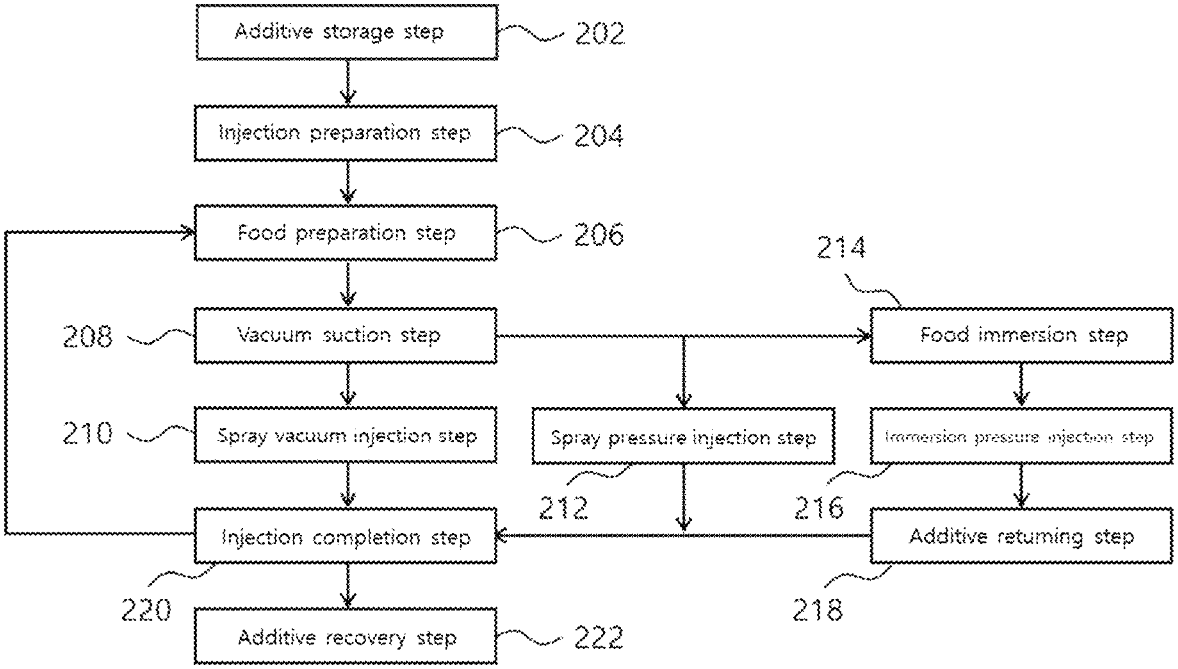
FIG. 13 is a diagram illustrating a flowchart of an injection step in the apparatus for injecting the additive according to the present invention.

FIG. 1 is a diagram illustrating a configuration of an apparatus for injecting an additive according to the present invention, FIG. 2 is a diagram illustrating an additive storage step in the apparatus for injecting the additive according to the present invention, FIG. 3 is a diagram illustrating an injection preparation step in the apparatus for injecting the additive according to the present invention, FIG. 4 is a diagram illustrating a food preparation step in the apparatus for injecting the additive according to the present invention, FIG. 5 is a diagram illustrating a vacuum suction step in the apparatus for injecting the additive according to the present invention, FIG. 6 is a diagram illustrating a spray vacuum injection step in the apparatus for injecting the additive according to the present invention, FIG. 7 is a diagram illustrating a spray pressure injection step in the apparatus for injecting the additive according to the present invention, FIG. 8 is a diagram illustrating a food immersion step in the apparatus for injecting the additive according to the present invention, FIG. 9 is a diagram illustrating an immersion pressure injection step in the apparatus for injecting the additive according to the present invention, FIG. 10 is a diagram illustrating an additive returning step in the apparatus for injecting the additive according to the present invention, FIG. 11 is a diagram illustrating an injection completion step in the apparatus for injecting the additive according to the present invention, FIG. 12 is a diagram illustrating an additive recovery step in the apparatus for injecting the additive according to the present invention, and FIG. 13 is a diagram illustrating a flowchart of an injection step in the apparatus for injecting the additive according to the present invention.

An apparatus for injecting an additive into a food according to the present invention includes a storage unit 100 for storing an additive S to be injected into a food F; an injection unit 110 mounted with a storage container 113 containing the food F and injecting the additive S into the food F; a vacuum suction unit 120 for sucking air in an injection tank 111 to make a vacuum pressure; a compression unit 130 for increasing the pressure by supplying air into the injection tank 111; a supply unit 140 for supplying the additive S in a storage tank 101 to the injection tank 111; a return unit 150 for returning the additive S in the injection tank 111 to the storage tank 101; a recovery unit 160 for recovering the additive S in the storage tank 101 and the injection tank 111; and a control unit (not illustrated) for controlling the storage unit, the injection unit, the vacuum suction unit, the compression unit, the supply unit, the return unit, and the recovery unit.

The storage unit stores the additive S to be injected into the food F, assists so that the stored additive S is supplied to the injection tank 111 to be injected, and returns and stores again the additive S in the injection tank 111 remaining after the injection is completed.

First, the additive S is filled in the storage tank 101 up to the position of a first level sensor 103 by opening a first shut-off valve 102. At this time, the position of the first level sensor 103 indicates the upper limit of the storage amount when the additive S is filled in the storage tank 101.

The position of the first level sensor 103 is located below a connection position between the storage tank 101 and a discharge-side return flow path 152 of a second circulation pump 151 mounted to return the additive S of the injection tank 111 to the storage tank 101.

This is because it is preferred that a suction-side flow path of the pump is immersed in a fluid and the discharge-side flow path of the pump is not immersed in the fluid.

The second level sensor 104 is for detecting a minimum storage position of the additive S required for the additive S injection operation, and is a sensor for detecting a lowest level so that a suction-side supply flow path 142 of the first circulation pump 141 is immersed in the additive S when the most additive S is supplied from the storage tank 101 to the injection tank 111.

That is, in the case of supplying the most additive S from the storage tank 101 to the injection tank 111, the food F in the injection tank 111 is supplied up to the position of a fifth level sensor 117 so as to be completely immersed in the additive S. At this time, the level of the additive S in the storage tank 101 should be set such that the suction-side supply flow path 142 of the first circulation pump 141 is immersed in the additive S, and located above a reference level L illustrated in the drawings.

Meanwhile, even if the amount of the additive S decreases as the additive S injection operation is repeated after storing the initial additive S, it is preferred that the size of the storage tank 101 is sufficiently provided so that there is no need to replenish the additive S until the additive S is recovered.

The first level sensor 103 illustrated according to the exemplary embodiment of the present invention and the position of the first level sensor 103 are only for description, and may also be installed above or below the storage tank 101 according to a type of sensor.

The first level sensor 103 and the second level sensor 104 are for detecting the level, and may use various types of level sensors, such as a level sensor that measures the level by attaching an electrode rod to check the level or by checking the ultrasonic waves reflected from the water surface through ultrasonic waves, a semiconductor type level sensor, a level sensor that measures the level through the pressure of the water, a capacitive level sensor, etc.

The injection unit provides a means for mounting the food F and injecting the additive S into the food F.

The injection tank 111 provides a space for performing the additive S injection operation, and a cover 112 is provided on the upper portion to open or close the injection tank 111.

Considering that the food F in the injection tank 111 is immersed in the additive S for injection, the cover 112 is preferably installed above the injection tank 111, but may also be installed on the side surface thereof.

The storage container 113 contains food F, which is an additive S injection target, and the storage container 113 may be fabricated in the form of free entry and exit of the additive S so that the additive S may be injected into the food F while containing the food therein. When the storage container 113 is made of a plate material, the storage container 113 has a shape of free entry and exit of the additive S, such that the upper part is opened and the side surface and the lower surface are processed to have a sufficient number of holes. Of course, the storage container 113 may be fabricated as other structures such as a wire mesh.

A support 114 serves to support the storage container 113, and the upper surface of the support 114 is in contact with the lower surface of the storage container 113 and may be formed so that the additive S may be entered and exited to the lower surface of the storage container 113 through the upper surface of the support 114, and the other side surface of the support 114 may be formed in a structure of free entry and exit of the additive S.

The third level sensor 115, the fourth level sensor 116, and the fifth level sensor 117 are used as means for detecting the level of the additive S in the injection tank 111. The third level sensor 115 is used to detect the lowest level when the food F contained in the storage container 113 is not immersed in the additive S, and the fourth level sensor 116 is used to detect the maximum level when the food F contained in the storage container 113 is not immersed in the additive S. On the other hand, the fifth level sensor 117 is used to detect the level when the food F contained in the storage container 113 is completely immersed in the additive S.

The third level sensor 115 and the fourth level sensor 116 are for providing level information so that the food F is not immersed in the additive S when the additive S is sprayed and injected, that is, in a spray vacuum injection step (210) and a spray pressure injection step (212).

In addition, the fifth level sensor 117 is for providing level information so that the food F should be immersed in the additive S when the food F is immersed in the additive S and then the additive S is injected, that is, in an immersion pressure injection step (216).

The third level sensor 115, the fourth level sensor 116, and the fifth level sensor 117 may use various sensors such as the first level sensor 103 and the second level sensor 104, and are preferably installed on the side surface of the injection tank 111, but may also be installed above or below the injection tank 111.

The second shut-off valve 118 may be selectively opened when a vacuum pressure or ascending pressure inside the injection tank 111 is made into atmospheric pressure, which may be performed after the injection of the additive S into the food F is completed, that is, before the storage container 113 containing the food F injected with the additive S is taken out from the injection tank 111.

The vacuum suction unit provides a means for making the inside of the injection tank 111 in a vacuum pressure by sucking air inside the injection tank 111.

A vacuum pump 121 of the suction unit 120 provides power to suck the air inside the injection tank 111 through a suction flow path 122 connected to the upper portion of the injection tank 111.

A first air storage tank 123 is installed in the suction flow path 122 at the front end of the vacuum pump 121, and the first air storage tank 123 serves to operate the vacuum pump 121 to store the air when sucking the air inside the injection tank 111, and reduce the impact generated at the moment when the air suction is started. A drain valve 127 for draining is installed in the first air storage tank 123.

A first opening/closing valve 124 may be mounted on the suction flow path 122 between the injection tank 111 and a vacuum gauge 126, and is selectively opened only when the vacuum pump 121 is operated.

A vacuum regulator 125 is mounted on the suction flow path 122 so that the pressure in the injection tank 111 is constantly maintained at a set vacuum pressure, and may be installed between the vacuum gauge 126 and the first air storage tank 123.

The vacuum gauge 126 may be mounted between the first opening/closing valve 124 and the vacuum regulator 125, and may check the vacuum pressure inside the injection tank 111.

The compression unit provides a means for increasing the internal pressure of the injection tank 111 by supplying air into the injection tank 111.

An air compressor 131 of the compression unit 130 provides power to supply the air into the injection tank 111 through the compression flow path 132 connected to the injection tank 111.

A second air storage tank 133 is installed in the compression flow path 132 at the front end of the air compressor 131, and the second air storage tank 133 serves to operate the air compressor 131 to store the air when supplying the air into the injection tank 111, and reduce the impact generated at the moment when the air supply is started. A drain valve 137 for draining is installed in the second air storage tank 133.

A second opening/closing valve 134 may be mounted on the compression flow path 132 between the injection tank 111 and a pressure gauge 136, and is selectively opened only when the air compressor 131 is operated.

A pressure regulator 135 is mounted on the compression flow path 132 so that the pressure in the injection tank 111 is constantly maintained at a set vacuum pressure, and may be installed between the pressure gauge 136 and the second air storage tank 133.

The pressure gauge 136 may be mounted between the second opening/closing valve 134 and the pressure regulator 135, and may check the pressure inside the injection tank 111.

The supply unit provides a means for supplying the additive S of the storage tank 101 to the injection tank 111.

The supply flow path 142 of the supply unit 140 is connected between the lower portion of the storage tank 101 and the upper portion of the injection tank 111.

The first circulation pump 141 of the supply unit 140 is located below the storage tank 101 and mounted on the supply flow path 142 connected to the storage tank 101, and provides power so as to supply the additive S in the storage tank 101 to the injection tank 111.

A third opening/closing valve 143 is selectively opened only when the first circulation pump 141 is operated to supply the additive S in the storage tank 101 to the injection tank 111.

An end of the supply flow path 142 connected to the injection tank 111 is connected to an injection nozzle 144 located inside the injection tank 111.

When the first circulation pump 141 is operated while the third opening/closing valve 143 is opened, the additive S in the storage tank 101 is supplied to the injection nozzle 144 in the injection tank 111 through the supply flow path 142, and then the additive S is sprayed onto the food F contained in the storage container 113.

The spray nozzle 144 is preferably integrally coupled to the cover 112 so that there is no interference when the storage container 113 containing the food F is put into or taken out from the injection tank 111.

The return unit provides a means for returning the additive S in the injection tank 111 to the storage tank 101.

A return flow path 152 of the return unit 150 is connected between the lower portion of the injection tank 111 and the upper portion of the storage tank 101.

A second circulation pump 151 of the return unit 150 is located below the injection tank 111 and mounted on the return flow path 152 connected to the injection tank 111, and provides power so that the additive S remaining in the injection tank 111 after injection may be returned to the storage tank 101.

A fourth opening/closing valve 153 is selectively opened only when the second circulation pump 151 is operated to return the additive S in the injection tank 111 to the storage tank 101.

It is preferred that the suction-side flow path of the second circulation pump 151 is immersed in the additive S, and to this end, the third level sensor 115 is provided to detect the lowest level.

The recovery unit provides a means for recovering the additive S in the storage tank 101 and the injection tank 111 after the additive S is replaced or the injection operation is finished.

A first recovery flow path 163 is connected between the lower portion of the storage tank 101 and a recovery tank 162, and a second recovery flow path 164 is connected between the lower portion of the injection tank 111 and a junction Z of the first recovery flow path 163.

A third circulation pump 161 of the recovery unit 160 is mounted between the junction Z where the first recovery flow path 163 and the second recovery flow path 164 meet and the recovery tank 162, and provides power so that the additive S in the storage tank 101 and the injection tank 111 may be recovered to the recovery tank 162 through the first recovery flow path 163 and the second recovery flow path 164.

A fifth opening/closing valve 165 is mounted on the first recovery flow path 163 between the third circulation pump 161 and the recovery tank 162, and a sixth opening/closing valve 166 is mounted between the lower portion of the injection tank 111 and the junction Z where the first recovery flow path 163 and the second recovery flow path 164 meet to be selectively opened only when the third circulation pump 161 is operated for recovering the additive S.

The additive S recovered to the recovery tank 162 may be removed by opening a third shut-off valve 167.

The control unit (not illustrated) allows the apparatus for injecting the additive into the food of the present invention to be automatically controlled.

To this end, it is preferred that electronic valves such as solenoid valves are used for the first opening/closing valve 124 to the sixth opening/closing valve 166, the second shut-off valve 118, the vacuum regulator 125, and the pressure regulator 135, and automatic drain valves may be used as the drain valves 127 and 137.

When the first shut-off valve 102 and the third shut-off valve 167 are equipped with an automatic additive supply device and an automatic additive removal device, which are not included in the present invention, electronic valves such as solenoid valves may be used.

The control unit (not illustrated) controls the components according to a sensor signal and an injection method from the first level sensor 103 to the fifth level sensor 117, the pressure, time, and the like set in the vacuum suction step, the spray vacuum injection step, the spray pressure injection step, and the immersion pressure injection step, to provide a control means so that the additive S injection operation is automatically performed.

A method for injecting an additive into a food using the apparatus for injecting the additive into the food according to a preferred exemplary embodiment of the present invention may include an additive storage step (202) of storing the additive S in the storage tank 101; an injection preparation step (204) of filling the additive S in the injection tank 111 up to the position of the third level sensor 115 so that the suction-side flow path of the second circulation pump 151 is immersed in the additive S; a food preparation step (206) of containing the food F in the storage container 113 and mounting the storage container 113 on the support 114 inside the injection tank 111; a vacuum suction step (208) of making the pressure inside the injection tank 111 into a vacuum pressure state; a spray vacuum injection step (210) of spraying and injecting the additive S to the food F through the spray nozzle 144 while maintaining a set vacuum pressure; a spray pressure injection step (212) of spraying and injecting the additive S into the food F through the spray nozzle 144 while maintaining the set pressure; a food immersion step (214) of supplying the additive S to the injection tank 111 so that the food F in the injection tank 111 is completely immersed in the additive S; an immersion pressure injection step (216) of injecting the additive S into the food F by pressurization while maintaining a state where the food F is completely immersed in the additive S; an additive returning step (218) of returning the additive S in the injection tank 111 to the storage tank 101; an injection completion step (220) of taking out the food F after making the internal pressure of the injection tank 111 into atmospheric pressure; and an additive recovery step (222) of recovering the additive S in the storage tank 101 and the injection tank 111.

Hereinafter, the method will be described in more detail with reference to FIGS. 2 to 12 as follows. In the additive storage step (202), as illustrated in FIG. 2, the first shut-off valve 102 is opened and the additive S is filled up to the level at which the first level sensor 103 is located.

When the additive S is filled in the storage tank 101 manually, or an automatic additive supply device not included in the present invention is equipped, the first shut-off valve 102 may be controlled to open automatically so as to enable the automatic supply of the additive S.

The next injection preparation step (204), as illustrated in FIG. 3, is a process of being performed once before the first injection operation is performed after the additive S is filled in the storage tank 101, and is to allow the suction-side flow path of the second circulation pump 151 to be immersed in the additive S.

Thereafter, since the suction-side flow path of the second circulation pump 151 is operated to be immersed in the additive S until the additive S is recovered, the injection preparation step (204) is not required.

The injection preparation step (204), as illustrated in FIG. 3, is to allow the suction-side flow path of the second circulation pump 151 to be initially immersed in the additive S. However, strictly, thereafter, since the suction-side flow path of the second circulation pump 151 is immersed in the additive S in the spray vacuum injection step (210), the spray pressure injection step (212), and the food immersion step (214), the injection preparation step (204) may be omitted.

Meanwhile, since the first recovery flow path 163 on the suction side of the third circulation pump 161 is immersed in the additive S in the additive storage step (202), a separate pre-operation is not required.

In the next food preparation step (206), as illustrated in FIG. 4, after opening the cover 112 of the injection tank 111, the food F into which the additive S is to be injected is contained in the storage container 113 and the storage container 113 is mounted on the support 114 in the injection tank 111. It is preferable to use a separately equipped automatic mounting device for the mounting operation, and when the automatic mounting device is equipped, the cover 112 of the injection tank 111 may be automatically controlled.

In the next vacuum suction step (208), as illustrated in FIG. 5, an operation process of making the pressure in the injection tank 111 into a vacuum pressure is performed.

In the vacuum suction step (208), while the first opening/closing valve 124 is opened, the vacuum pump 121 is operated to suck the air in the injection tank 111 through the suction flow path 122 connected to the injection tank 111 so that the pressure in the injection tank 111 becomes a set vacuum pressure.

At this time, the pressure may be controlled by the vacuum regulator 125 installed in the suction flow path 122 so that the pressure in the injection tank 111 may be constantly maintained at the set vacuum pressure, and the magnitude of the vacuum pressure in the injection tank may be observed by the vacuum gauge 126 installed in the suction flow path 122.

In the next spray vacuum injection step (210), as illustrated in FIG. 6, while the third opening/closing valve 143 is opened, the first circulation pump 141 mounted on the supply flow path 142 is operated to spray the additive S in the storage tank 101 on the food F contained in the storage container 113 through the supply flow path 142 and the spray nozzle 144 connected to the supply flow path 142 and inject the additive S into the food F in the vacuum state.

At this time, the vacuum pressure may be maintained by maintaining the vacuum pressure in the vacuum suction step (208) or by making a vacuum pressure lower than the vacuum pressure in the vacuum suction step (208).

In the next spray pressure injection step (212), as illustrated in FIG. 7, while the third opening/closing valve 143 is opened, the first circulation pump 141 mounted on the supply flow path 142 is operated to spray the additive S in the storage tank 101 on the food F contained in the storage container 113 through the supply flow path 142 and the spray nozzle 144 connected to the supply flow path 142 and inject the additive S into the food F by pressurization.

At this time, the pressure is increased by opening the second opening/closing valve 134 installed in the compression flow path 132 and operating the air compressor 131 to supply the air into the injection tank 111, and the pressure is controlled by the pressure regulator 135 installed in the compression flow path 132 so that the pressure in the injection tank 111 may be constantly maintained at a set pressure. The magnitude of the pressure in the injection tank 111 may be observed with the pressure gauge 136 mounted on the compression flow path 132.

In the next food immersion step (214), as illustrated in FIG. 8, the first circulation pump 141 mounted on the supply flow path 142 is operated to supply the additive S in the storage tank 101 to the injection tank 111 through the supply flow path 142 and the injection nozzle 144 connected to the supply flow path 142 and then reach up to a level at which the fifth level sensor 117 is located so that the food F is completely immersed in the additive S.

The next immersion pressure injection step (216), as illustrated in FIG. 9, is performed after the food immersion step (214) is completed. While the food F is immersed in the additive S, the air is supplied into the injection tank 111 to increase the pressure by opening the second opening/closing valve 134 installed in the compression flow path 132 and operating the air compressor 131 installed in the compression flow path 132, so that the additive S is injected into the food F by the increasing pressure.

At this time, the pressure may be controlled by the pressure regulator 135 installed in the compression flow path 132 so that the pressure in the injection tank 111 may be constantly maintained at the set pressure, and the magnitude of the pressure in the injection tank 111 may be observed by the pressure gauge 136 installed in the compression flow path 132.

Next, in the additive returning step (218), as illustrated in FIG. 10, while the fourth opening/closing valve 153 mounted on the return flow path 152 is opened, the second circulation pump 151 is operated to return the additive S in the injection tank 111 to the storage tank 101 through the return flow path 152. The returning of the additive S is performed until the position of the additive S in the injection tank 111 reaches the position of the third level sensor 115. The returning step occurs when the immersion pressure injection step (216) is completed.

On the other hand, even when the additive S ascends to the position of the fourth level sensor 116 while the spray vacuum injection step (210) and the spray pressure injection step (212) are operated, the returning of the additive S is performed.

Next, the injection completion step (220), as illustrated in FIG. 11, is a process of opening the cover 112 and taking out the storage container 113 containing the food F after making the pressure in the injection tank 111 into the atmospheric pressure by opening the second shut-off valve 118 mounted on the injection tank 111 when the process of injecting the additive S into the food F in the injection tank 111 is completed.

Next, in the additive recovery step (222), as illustrated in FIG. 12, when the additive S injection operation is repeated several times and then it is the time to exchange the additive S, while the fifth opening/closing valve 165 installed in the first recovery flow path 163 and the sixth opening/closing valve 166 installed in the second recovery flow path 164 are opened, the third circulation pump 161 installed in the first recovery flow path 163 is operated to recover the additive S in the storage tank 101 and the injection tank 111 to the recovery tank 162 through the first recovery flow path 163 and the second recovery flow path 164.

The additive S recovered to the recovery tank 162 may be removed to the outside by opening the third shut-off valve 167.

FIG. 13 illustrates a method of injecting an additive into a preferred food for each step according to an exemplary embodiment of the present invention, which will be described in detail with reference to the drawings.

As illustrated in FIG. 13, first, in the additive storage step (202), the first shut-off valve 102 is opened and the additive S is added and stored in the storage tank 101.

Next, in the injection preparation step (204), while the third opening/closing valve 143 installed in the supply flow path 142 is opened, the first circulation pump 141 mounted on the supply flow path 142 is operated to supply the additive S in the storage tank 101 to the injection tank 111 through the supply flow path 142 and the spray nozzle 144 up to the level where the third level sensor 115 is located.

Next, in the food preparation step (206), after the cover 112 of the injection tank 111 is opened, the food F into which the additive S is to be injected is contained in the storage container 113 and the storage container 113 is mounted on the support 114 in the injection tank 111.

Next, in the vacuum suction step (208), while the first opening/closing valve 124 is opened, the vacuum pump 121 is operated to suck the air in the injection tank 111 through the suction flow path 122 connected to the injection tank 111 so that the pressure in the injection tank 111 becomes a set vacuum pressure. At this time, desired vacuum pressure and vacuum suction time are set.

Next, when the spray vacuum injection is performed, in the spray vacuum injection step (210), while the third opening/closing valve 143 is opened, the first circulation pump 141 mounted on the supply flow path 142 is operated to spray the additive S in the storage tank 101 on the food F contained in the storage container 113 through the supply flow path 142 and the spray nozzle 144 connected to the supply flow path 142 and inject the additive S into the food F in the vacuum state. At this time, desired vacuum pressure and vacuum injection time are set.

Meanwhile, when the spray pressure injection is performed after the vacuum suction step (208), in the spray pressure injection step (212), while the third opening/closing valve 143 is opened, the first circulation pump 141 mounted on the supply flow path 142 is operated to spray the additive S in the storage tank 101 on the food F contained in the storage container 113 through the supply flow path 142 and the spray nozzle 144 connected to the supply flow path 142 and inject the additive S into the food F in the pressurized state. At this time, desired pressure and pressure injection time are set.

Meanwhile, when the immersion pressure injection is performed after the vacuum suction step (208), since the food immersion step (214) is performed, the first circulation pump 141 mounted on the supply flow path 142 is operated to supply the additive S in the storage tank 101 to the injection tank 111 through the supply flow path 142 and the spray nozzle 144. At this time, the additive S is supplied up to the level at which the fifth level sensor 117 is located so that the food F is completely immersed in the additive S.

Next, since the immersion pressure injection step (216) is performed while the food F is immersed in the additive S, the air is supplied into the injection tank 111 to increase the pressure by opening the second opening/closing valve 134 installed in the compression flow path 132 and operating the air compressor 131 installed in the compression flow path 132, so that the additive S is injected into the food F. At this time, desired pressure and pressure injection time are set.

Next, in the additive returning step (218), while the fourth opening/closing valve 153 mounted on the return flow path 152 is opened, the second circulation pump 151 is operated to return the additive S in the injection tank 111 to the storage tank 101 through the return flow path 152. At this time, the returning is performed until the additive S in the injection tank 111 reaches the position of the third level sensor 115.

Next, in the injection completion step (220), the second shut-off valve 118 mounted on the injection tank 111 is opened to make the pressure in the injection tank 111 into the atmospheric pressure, and then the cover 112 is opened to take out the storage container 113 containing the food F.

When it is the time to exchange the additive S while the additive injection operation is repeated, while the fifth opening/closing valve 165 installed in the first recovery flow path 163 and the sixth opening/closing valve 166 installed in the second recovery flow path 164 are opened, the third circulation pump 161 installed in the first recovery flow path 163 is operated to recover the additive S in the storage tank 101 and the injection tank 111 to the recovery tank 162 through the first recovery flow path 163 and the second recovery flow path 164.

In the vacuum suction step (208), when the food F is cherry tomatoes and the additive S is stevioside, generally, vacuum suction is performed for 30 to 60 seconds while the vacuum gauge pressure is maintained at about 0.05 bar, but it is just an exemplary embodiment, and needs to be set according to types and characteristics of the food F and the additive S.

The vacuum suction makes the pressure in the additive S injection tank 111 to be a vacuum, so that the air inside the food F is discharged to the outside, thereby easily injecting the additive S into the food F.

When the food F is cherry tomatoes and the additive S is stevioside, generally, in the spray vacuum injection step (210), the vacuum gauge pressure is maintained at about 0.05 bar to 0.15 bar, and the vacuum injection is performed for 5 to 15 minutes. In the spray pressure injection step (212), the pressure is maintained at about 0.10 bar to 0.30 bar, and in the immersion pressure injection step (216), the pressure is maintained at about 1.5 bar to 3.0 bar, and the pressure injection is performed for 5 to 15 minutes. It is just an exemplary embodiment, and needs to be set according to types and characteristics of the food F and the additive S.

Even if the same additive S is injected into the same food F, since the injection state of the additive S is changed depending on the pressure magnitude and the injection time, of course, it should be set according to a desired sugar content.

As set forth above, according to exemplary embodiments of the invention, in the apparatus for injecting the additive to the food of the present invention, when the additive is injected into food, a spray vacuum injection method, a spray pressure injection method, and an immersion pressure injection method can be applied independently, or these injection methods can be combined and applied. In addition, the apparatus has a structure that allows repeated additive injection by supplying and returning the additive between a storage tank and an injection tank, so that there are great advantages of greatly increasing the productivity as well as injecting various additives into various foods.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for injecting an additive into a food, comprising:

a storage unit for storing the additive to be injected into the food;

an injection unit mounted with a storage container containing the food and injecting the additive into the food;

a vacuum suction unit for sucking air in an injection tank to make a vacuum pressure;

a compression unit for increasing the pressure by supplying air into the injection tank;

a supply unit for supplying the additive in a storage tank to the injection tank;

a return unit for returning the additive in the injection tank to the storage tank;

a recovery unit for recovering the additive in the storage tank and the injection tank; and a controller for controlling the storage unit, the injection unit, the vacuum suction unit, the compression unit, the supply unit, the return unit, and the recovery unit, wherein the controller is configured to receive signals from a first level sensor and a second level sensor installed in the storage unit, and a third level sensor, a fourth level sensor and a fifth level sensor each installed at a different level in the injection unit, and to automatically control a plurality of opening/closing valves and a plurality of circulation pumps based on the signals from the third, fourth, and fifth level sensors to sequentially perform a multi-stage injection operation including:

a spray injection step of spraying the additive to the food through a spray nozzle of the supply unit while maintaining a level of the additive in the injection tank between a minimum level sensed by the third level sensor and a maximum level sensed by the fourth level sensor such that the food is not immersed in the additive; and an immersion pressure injection step, performed after the spray injection step, of supplying the additive into the injection tank until the fifth level sensor senses that the food is completely immersed in the additive, and then injecting the additive into the food by pressurizing an inside of the injection tank;

wherein the return unit includes:

at least one of the plurality of circulation pumps for providing power so that the additive in the injection tank may be returned to the storage tank;

a return flow path which is connected to a lower portion of the injection tank and an upper portion of the storage tank to guide the additive in the injection tank to be returned to the storage tank; and at least one of the plurality of opening/closing valves for selectively opening or closing the return flow path.

2. The apparatus for injecting the additive into the food of claim 1, wherein the storage unit includes:

the storage tank which stores the additive and assists to inject the additive;

a first shut-off valve provided to open or close the storage tank;

the first level sensor for sensing a maximum storage position when the additive is filled in the storage tank; and the second level sensor for sensing a minimum storage position of the additive required for the additive injection operation.

3. The apparatus for injecting the additive into the food of claim 1, wherein the injection unit includes:

the injection tank for providing a space so that the additive injection operation may be performed;

a cover provided to open or close the injection tank;

the storage container provided to contain the food to be injected with the additive;

a support provided to mount the storage container containing the food;

the third level sensor for sensing a minimum level when the food is not immersed in the additive;

the fourth level sensor for sensing a maximum level when the food is not immersed in the additive;

the fifth level sensor for sensing a level when the food is completely immersed in the additive; and a second shut-off valve that is selectively opened when the pressure inside the injection tank is made into atmospheric pressure.

4. The apparatus for injecting the additive into the food of claim 1, wherein the vacuum suction unit includes:

a vacuum pump for providing power to suck the air inside the injection tank;

a suction flow path connected between the injection tank and the vacuum pump to guide the air inside the injection tank to be sucked;

an air storage tank for storing the air and reducing an impact generated at a moment when the air suction is started;

at least one of the plurality of opening/closing valves for selectively opening or closing the suction flow path;

a vacuum regulator for maintaining the pressure in the injection tank at a set vacuum pressure;

a vacuum gauge indicating a pressure state in the injection tank; and a drain valve for discharging water filled in the first air storage tank.

5. The apparatus for injecting the additive into the food of claim 1, wherein the compression unit includes:

an air compressor for providing power to supply the air into the injection tank;

a compression flow path connected between the injection tank and the air compressor to guide the air to be supplied into the injection tank;

an air storage tank for storing the air and reducing an impact generated at a moment when the air supply is started;

at least one of the plurality of opening/closing valves for selectively opening or closing the compression flow a pressure regulator for maintaining the pressure in the injection tank at a set pressure;

a pressure gauge indicating a pressure state in the injection tank; and a drain valve for discharging water filled in the second air storage tank.

6. The apparatus for injecting the additive into the food of claim 1, wherein the supply unit includes:

at least one of the plurality of circulation pumps for providing power so that the additive in the storage tank may be supplied to the injection tank;

a supply flow path which is connected to a lower portion of the storage tank and an upper portion of the injection tank to guide the additive in the storage tank to be supplied to the injection tank;

at least one of the plurality of opening/closing valves for selectively opening or closing the supply flow path; and the spray nozzle connected to one end of the supply flow path and positioned at an upper portion in the injection tank to supply the additive to the food.

7. The apparatus for injecting the additive into the food of claim 1, wherein the recovery unit includes:

a recovery tank for storing the recovered additive;

at least one of the plurality of circulation pumps for providing power to recover the additive in the storage tank and the injection tank to the recovery tank;

a first recovery flow path connected to a lower portion of the storage tank to guide the additive to be recovered to the recovery tank;

a second recovery flow path connected to the lower portion of the injection tank to guide the additive up to a junction of the first recovery flow path so as to be recovered to the recovery tank;

at least one of the plurality of opening/closing valves for selectively opening or closing the first recovery flow path;

another one of the plurality of opening/closing valves for selectively opening or closing the second recovery flow path; and a shut-off valve for opening or closing the recovery tank.

8. A method for injecting an additive into a food using the apparatus for injecting the additive into the food of claim 3, the method comprising:

an additive storage step of storing the additive in the storage tank;

an injection preparation step of filling the additive in the injection tank up to a position of the third level sensor so that a suction-side flow path of another one of the plurality of circulation pumps is immersed in the additive;

a food preparation step of containing the food in the storage container and mounting the storage container on a support inside the injection tank;

a vacuum suction step of making the pressure inside the injection tank into a vacuum pressure state;

a spray vacuum injection step of spraying and injecting the additive to the food through the spray nozzle while maintaining a set vacuum pressure by including a supply flow path connected between a lower portion of the storage tank and an upper portion of the injection tank to guide the additive of the storage tank to be supplied to the injection tank and the spray nozzle connected to one end of the supply flow path and located at the upper portion in the injection tank to supply the additive to the food;

a spray pressure injection step of spraying and injecting the additive into the food through the spray nozzle while maintaining the set pressure;

a food immersion step of supplying the additive to the injection tank so that the food in the injection tank is completely immersed in the additive;

an immersion pressure injection step of injecting the additive into the food by pressurization while maintaining a state where the food is completely immersed in the additive;

an additive returning step of returning the additive in the injection tank to the storage tank;

an injection completion step of taking out the food after making the internal pressure of the injection tank into atmospheric pressure; and an additive recovery step of recovering the additive in the storage tank and the injection tank.

* * * * *